United States Patent [19]

Sauber

[11] Patent Number: 5,388,781
[45] Date of Patent: * Feb. 14, 1995

[54] CABLE PULLING AND REELING APPARATUS HAVING ANTI-SPILL DEVICE AND METHOD

[76] Inventor: Charles J. Sauber, 10 N. Sauber Rd., Virgil, Ill. 60182

[*] Notice: The portion of the term of this patent subsequent to Jun. 1, 2010 has been disclaimed.

[21] Appl. No.: 32,516

[22] Filed: Mar. 15, 1993

Related U.S. Application Data

[63] Continuation-in-part of Ser. No. 809,103, Dec. 11, 1991, Pat. No. 5,215,272, which is a continuation-in-part of Ser. No. 648,041, Jan. 30, 1991, abandoned.

[51] Int. Cl.$^6$ .................. B65H 75/34; B66D 1/20; B66D 1/38
[52] U.S. Cl. .................. 242/388.6; 242/390.8; 242/394.1; 242/158.3; 242/397.3; 254/134.3 R; 254/319; 254/320
[58] Field of Search ............ 242/54 R, 86.5 R, 86.8, 242/158.2, 158.3, 155 BW, 158 R, 388.6, 390.8, 390.9, 394.1, 397.3, 399.1, 398.2, 403, 403.1; 254/134.3 R, 279, 281, 284, 294, 304, 306, 307, 308, 311, 312, 316, 319, 320, 329, 332, 350, 352–354, 357, 369, 288

[56] References Cited

U.S. PATENT DOCUMENTS

| | | | |
|---|---|---|---|
| 980,220 | 11/1911 | Eastman . | |
| 2,948,483 | 8/1960 | Petersen | 254/134.3 R |
| 3,037,720 | 6/1962 | Leithiser | 242/155 BW |
| 3,143,309 | 8/1964 | Clarke | 254/357 X |
| 3,317,149 | 5/1967 | Gooch | 242/86.8 |
| 3,809,334 | 5/1974 | Beurer et al. | 242/158.3 |
| 3,934,854 | 1/1976 | Goode | 254/134.3 R |
| 4,234,167 | 11/1980 | Lane | 254/291 |
| 4,635,875 | 1/1987 | Apple | 254/294 |
| 4,666,102 | 5/1987 | Colbaugh et al. . | |
| 4,767,073 | 8/1988 | Malzacher | 242/54 R |

Primary Examiner—John M. Jillions
Attorney, Agent, or Firm—Leydig, Voit & Mayer Ltd.

[57] ABSTRACT

A method and apparatus for pulling cables has a subassembly including a cooperatively driven pulling line take-up spool and level winding device. The subassembly is utilized in combination with a capstan with the take-up spool, level winding device and capstan optionally driven jointly by the same drive. The motor drive is coupled to a motor drive shaft upon which the take-up spool is frictionally mounted. The motor drive shaft in turn is coupled separately to both a level winding device drive shaft and a capstan drive shaft to provide the cooperative drive. The assembly optionally includes a means for preventing spillage of the pulling line from the take-up spool when the motor is inoperative or reverse driven. The assembly, or sub-parts thereof are mounted on a tiltable table which permits pulling from various angles.

27 Claims, 8 Drawing Sheets

CABLE PULLING AND REELING APPARATUS HAVING ANTI-SPILL DEVICE AND METHOD

This application is a continuation-in-part of co-pending application Ser. No. 07/809,103 filed Dec. 11, 1991, now U.S. Pat. No. 5,215,272 which is a continuation-in-part of application Ser. No. 07/648,041 filed Jan. 30, 1991, now abandoned.

FIELD OF THE INVENTION

The present invention relates generally to pulling cables such as electrical wires or conductors, and more particularly is directed to a method and apparatus for level winding the cable pulling line around a take-up spool.

BACKGROUND OF THE INVENTION

In electrical wire or cable stringing applications, such as situations where wire is pulled through a conduit by a cable or line at a desired and controlled rate, there is a need for the pulling cable line to be supported under tension by use of some form of a cable support device such as a drum or spool. In cable laying operations the heavy electrical or mechanical cable to be pulled under tension through support conduits or over utility poles is in conventional practice hooked up to some kind of "fish wire" or "pulling line" attached to the leading end of the cable. In operation, the pulling line pulls the heavy cable through the conduit or over the poles until it is in the desired position. The pulling action is generally accomplished through a cable support drum or capstan which is rotatable.

The drum provides an anchoring surface on which the pulling line may be wound so as to utilize the rotational motion of the drum toward imparting pulling action on the cable. Under such conditions, forces are generated which accumulate and tend to collapse the drum or spool onto which the pulling line is being wound. Such collapsing generally occurs as a result of the cumulative effects of tension generated during the pulling action. One such effect is the direct result of the cable being under tension while it is actually being pulled by the pulling line. Another factor is the force existing due to the weight of the cable itself, which can amount to a significant value depending upon the particular cable winding application. The weight of the cable adds considerably to the operating tension particularly when the pulling line is utilized for lifting heavy cable through large distances in vertical conduits or poles, against gravitational forces. Another source of increased pulling force is the angle between the cable and the capstan. Because of this angle, the total force exerted on the cable has to be greater in order to provide a sufficient force component in a direction parallel to the capstan.

Since the surface of the drum onto which the pulling line is wound is the effective fulcrum of support, it is subjected to all the accumulated forces resulting from the tension generated as the pulling line is progressively wound or unwound around the support drum. Such accumulated forces of tension tend to collapse the drum or spool during the cable pulling operation. This collapsing effect of the tensioning forces is compounded when the cable pulling operation requires intermittent "pulling" and "braking" actions of the pulling line, which frequently is the case. In the past, this problem has been solved, among other ways, by the use of winding drums or spools made of heavy duty material capable of withstanding the compressive forces generated during high tension winding.

One solution to this problem is provided by Applicant's prior take-up system disclosed in U.S. Pat. No. 4,657,202. A reel assembly for playing out the cable is disclosed in Applicant's U.S. Pat. No. 4,325,522. Heavy duty capstans also have been utilized, but then the cable pulling line generally merely is played out onto the ground for later rewinding.

It would be desirable to provide a take-up spool which can be utilized in conjunction with a capstan, which take-up spool does not need to withstand the high forces transmitted to the capstan, and which will level wind the cable pulling line around the take-up spool for reuse.

It would be desirable if the take-up spool included a means for preventing spill of the wound cable pulling line when the motor is inoperative or being reverse driven.

It would further be desirable to optionally allow the entire winding assembly, or a subassembly thereof, to be movable so as to reduce or eliminate large angular differences between the capstan position and the approach of cable being reeled in.

OBJECTS AND SUMMARY OF THE INVENTION

It is, therefore, a primary object of the present invention to provide a level winding take-up spool for pulling cables.

A further object of the present invention is to provide a take-up spool which operates in conjunction with a capstan.

It is yet another object of the present invention to provide a single drive for the take-up spool, level winding device and capstan.

It is still another object of the present invention to allow pivotal motion of the take-up spool and capstan, either in combination or individually, in order to reduce or eliminate the angular approach between the capstan and the cable being reeled in.

It is another object of the invention to prevent spillage of the wound cable-pulling line from the take-up spool when the motor is inoperative, or when the capstan is reverse driven.

In general, the present invention contemplates a cable line pulling take-up spool and level winding device subassembly which are driven together. The subassembly is utilized in conjunction with a capstan with the take-up spool, level winding device and capstan driven by a single motor. The motor drives a take-up spool receiving means upon which the spool is mounted via a motor drive shaft frictionally coupled to the spool receiving means. The spool receiving means is coupled to a level winding drive shaft, and the motor drive shaft is coupled to a capstan drive shaft to provide a common drive for the apparatus. The take-up spool and capstan are mounted on a table, or the capstan is mounted on a separate table and is independently driven. In either case, one part of the table is attached to a frame by hinges which allow the table to be pivoted with respect to the frame. The table is attached on its underside to a hydraulic lifting device to allow tilting of the table. The take-up spool and capstan, along with the pivoting table, can be mounted on a cable pulling mobile trailer.

To prevent slippage of the take-up spool, the motor drive shaft includes a ratchet drive disc, which cooperates with a freely rotatable ratchet brake disc to only drive the take-up spool in a direction where the cable-pulling line is wound on the spool. A brake latch also engages the ratchet brake disc to prevent slippage of the take-up spool when the motor is inoperative or being driven in reverse.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1A:
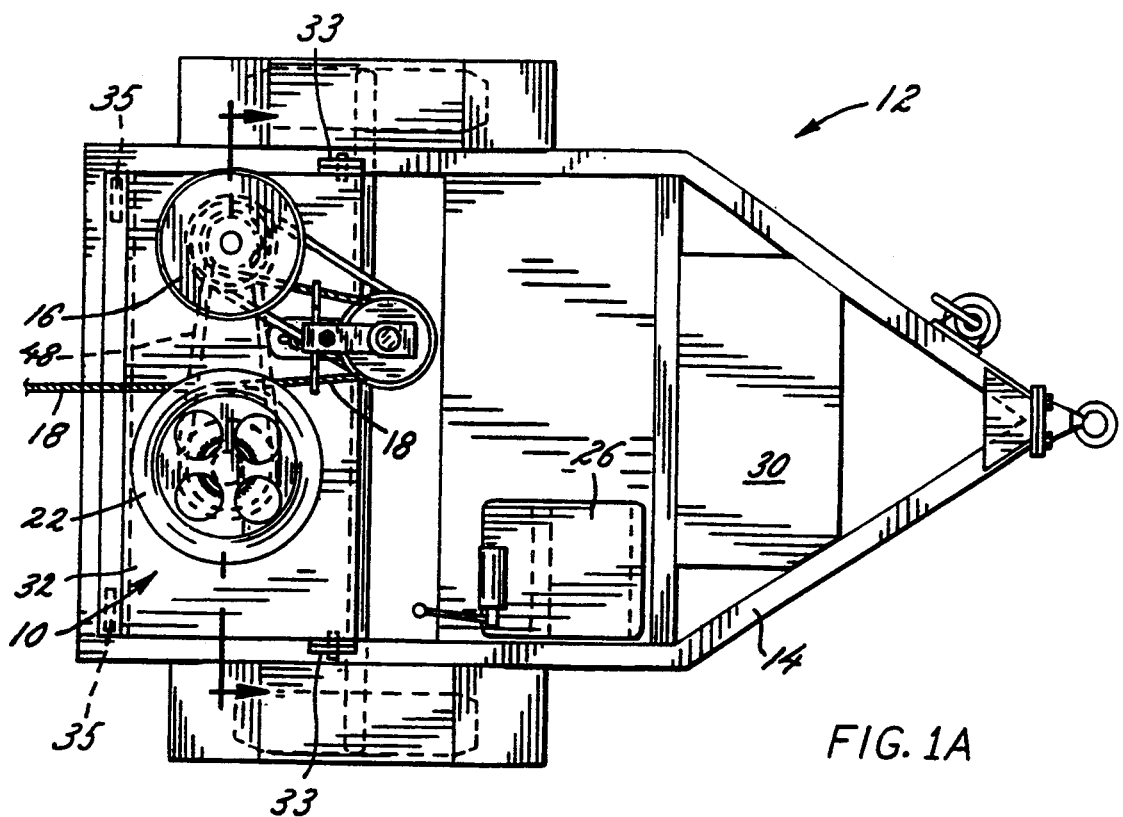
FIGS. 1A and 1B respectively are a top and side view of the cable pulling apparatus of the present invention mounted on a trailer.
Figure 1B:
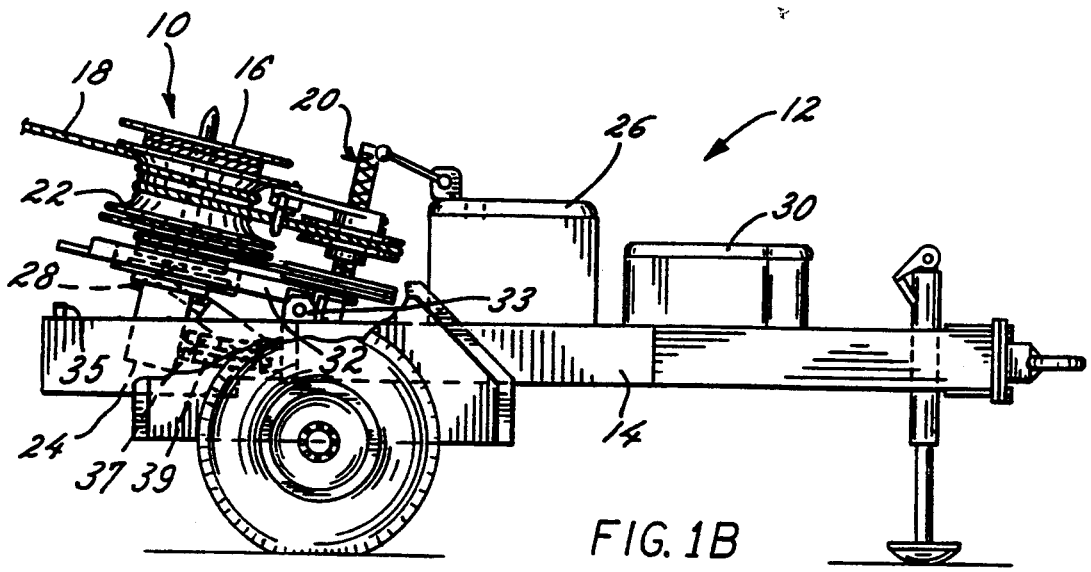

Turning to the drawings, there is shown in FIGS. 1A and 1B a cable pulling apparatus of the present invention generally indicated by the reference numeral 10. The cable pulling apparatus 10 is mounted, for example, onto a mobile cable trailer 12. The cable trailer 12 includes a base or frame 14 upon which the cable pulling apparatus 10 is mounted.

The cable pulling apparatus 10 includes three main elements, a take-up spool 16 upon which a cable, or more often a pulling line 18 (and hereafter described as a pulling line for example purposes) is wound. The pulling line 18 is level wound onto the take-up spool 16 by a level winding device 20. The pulling line 18 is pulled by a capstan 22.

Power is supplied to the cable pulling apparatus 10 by a drive motor 24, also mounted to the base 32. The drive motor 24, such as an Eaton Series 2000 two speed hydraulic motor is driven by a power unit 26. The drive motor 24, preferably directly drives a drive shaft 52 upon which take-up spool 16 is rotatably received, as is best illustrated with respect to FIGS. 2 and 3. The cable trailer 12 has a storage area 30 which can accommodate a plurality of take-up spools 16 for the pulling lines 18. The cable trailer 12 also can include other auxiliary equipment which can be utilized in the cable pulling operations.

Figure 2:
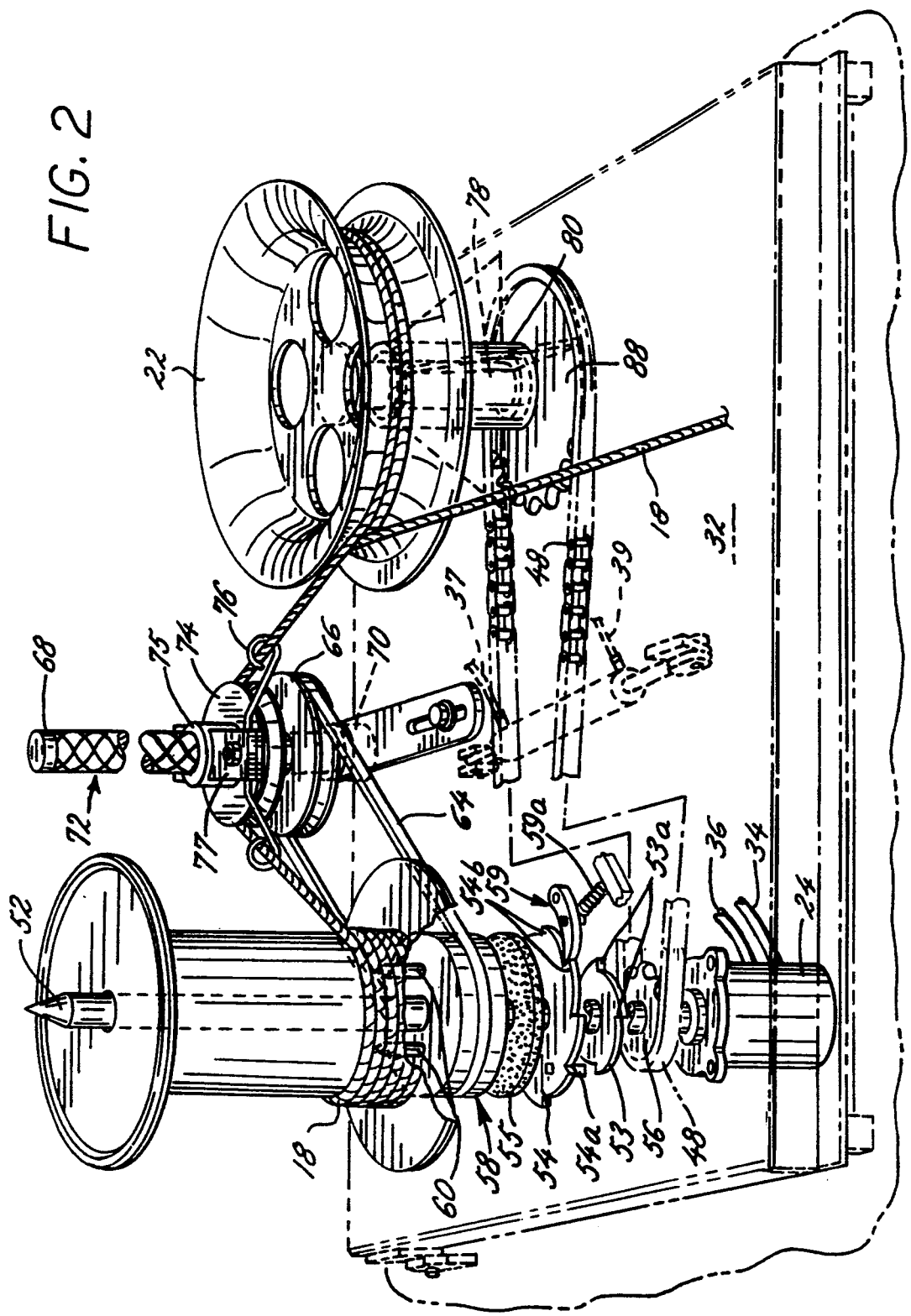
FIG. 2 is a perspective view of the cable pulling apparatus of the present invention.
Figure 3:
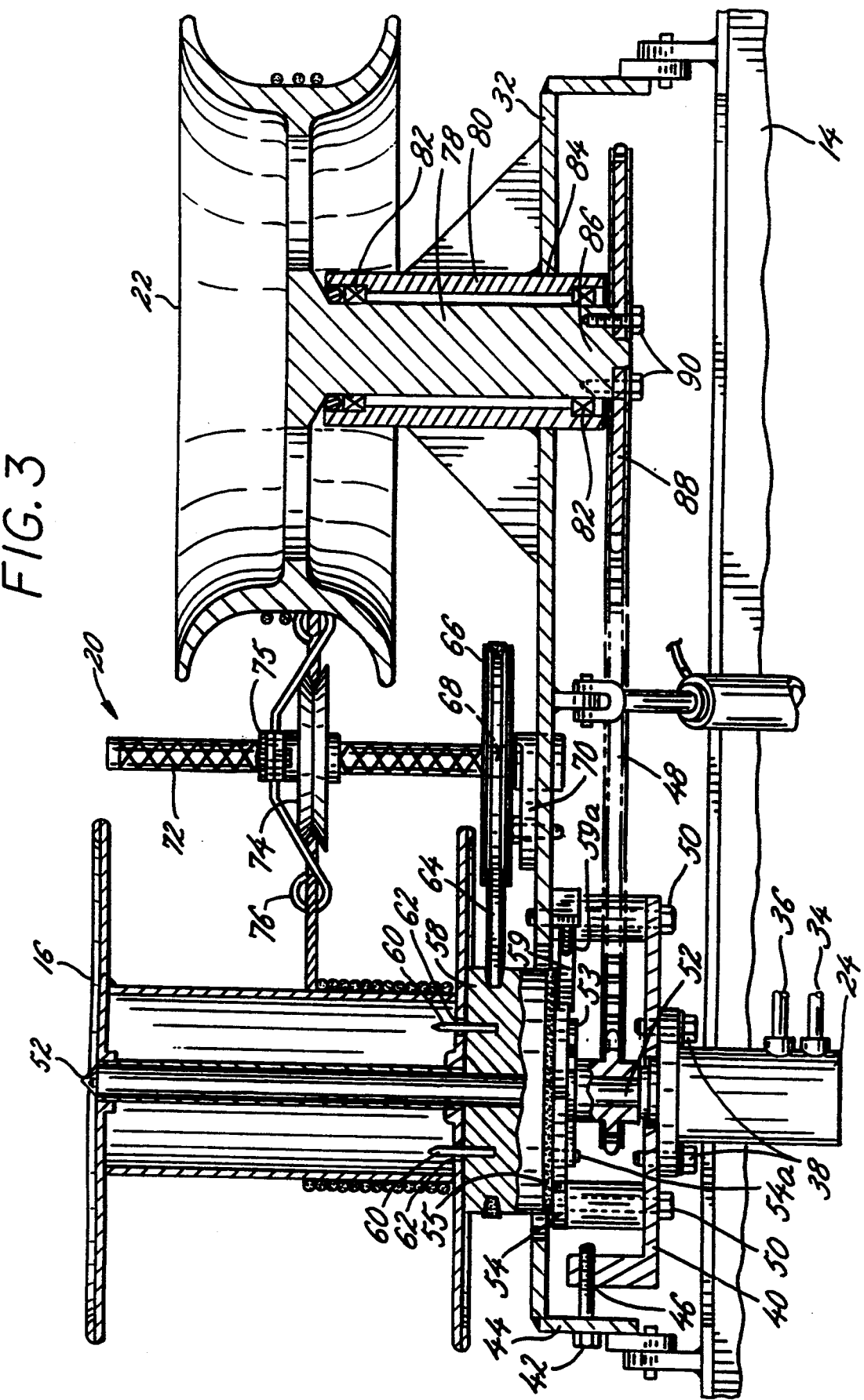
FIG. 3 is a side partial sectional view of the cable pulling apparatus of the present invention.

Referring now to FIGS. 2 and 3, the details of the cable pulling apparatus 10 are best illustrated. The cable pulling apparatus 10 is mounted onto a tilt table 32, which in turn is mounted onto any convenient base frame, such as the trailer frame 14.

The drive motor 24 is driven by a pair of hydraulic lines 34, 36 supplied by a power unit, such as the unit 26.

The drive motor 24 is mounted by a plurality of bolts 38 to a laterally adjustable support plate 40. The support plate 40 is laterally adjustable by a chain tightening bolt 42 mounted through a fixed side wall 44 of the frame 32. The bolt 42 is threaded through a nut 46 mounted on the support plate 40. The bolt 42 and hence the support plate 40 are adjusted to provide the proper tension to a drive chain 48 coupling the take-up spool 16 and the capstan 22, as described hereinafter. Once the proper tension is applied, the support plate 40 is secured to the frame 32 by a plurality of bolts 50.

The drive motor 24 includes a motor drive shaft 52 to which is mounted a ratchet drive disc 53. The ratchet drive disc 53 includes several cammed surfaces 53a. These surfaces engage ratchet engaging pawls 54a mounted on a ratchet brake disc 54. In that way, the rotation of the ratchet drive disc 53 is transferred to the ratchet brake disc 54. The ratchet brake disc 54 is rotatable about the motor drive shaft 52 and also includes several cammed surfaces 54b, which are engaged by stationary brake latch 59. Brake latch 59 is actuated by a spring 59a, biasing the latch 59 into engagement with cammed surface 54b. The engagement of brake latch 59 with cammed surfaces 54b prevents the ratchet brake disc 54 from rotating in a reverse sense to its driven direction. In FIG. 2, the brake latch 59 prevents counterclockwise rotation of ratchet brake disc 54. The ratchet brake disc 54 carries a resilient friction member 55 that can be made of rubber or the like. A drive sprocket 56 is provided for the drive chain 48. The motor drive shaft 52 also functions as a take up spindle for the take-up spool 16.

The ratchet brake disc 54 and friction member 55 provide a friction drive to pulley 58 mounted for rotation about the drive shaft 52 with the lower face of the pulley 58 resting on the friction member 55. The pulley 58 includes one or more drive pins 60, which are accommodated through apertures 62 in the take-up spool 16 to drive the take-up spool 16. The drive pins 60 and pulley 58 in this embodiment, serve as a spool receiving means. The pulley 58 also has a level winding device drive belt 64 mounted onto it. The opposite end of the drive belt 64 is mounted around a level winding device drive pulley 66 thus providing the drive to the level winding device.

For accurately winding the pulling line onto the take-up spool 16, a level winding device 20 is provided. The drive pulley 66 is mounted onto a drive shaft 68 of the level winding device 20. The drive shaft 68 is adjustably mounted to the frame 32 by an adjustable arm 70. The arm 70 and hence the drive shaft 68 are adjusted to provide the proper tension for the drive belt 64. The drive shaft 68 forms part of or is connected to a level wind screw 72. Mounted on the level wind screw 72 is a screw follower 75. A pulling line pulley 74 is mounted on screw follower 75 such that pulley 74 rotates about follower 75, and also moves vertically along with follower 75. To level wind the pulling line on the take-up spool 16, the screw follower 75, in conjunction with the rotating level wind screw 72, drives the pulling line pulley 74 reversibly up an down along the level wind screw 72. To ensure that screw follower 75 rides up and down on level wind screw 72, as opposed to rotating about screw 72, a line guide 76 is provided. Line guide 76 is attached to arm 77 which is fixed to follower 75. The cable pulling line is fed through the two openings of the line guide 76. The tension in the pulling line thus prevents the line guide 76, and the follower 75 to which it is attached, from rotating. As a result, follower 75 properly feeds up and down on level wind screw 72.

The capstan 22 includes a capstan drive shaft 78 rotatably mounted into a fixed hollow shaft 80 by a plurality of bearings 82. The hollow shaft 80 is mounted in an aperture 84 of the frame 32. A bottom portion 86 of the capstan drive shaft 78 extends beyond the hollow shaft 80 and has a drive sprocket 88 mounted thereto by a plurality of bolts 90. The cable pulling apparatus 10 as described in this embodiment has one drive source 24, driving all three of the take-up spool 16, the level winding device 20 and the capstan 22 together. The capstan 22 withstands the pulling forces exerted by the pulling line 18 and cable attached thereto, while being driven by the motor drive shaft 52. The line 18 is level wound onto the take-up spool 16 by the level winding device 20, also driven by the take-up spool drive pulley 58.

It will be appreciated that with the friction drive arrangement, pulley 58 and spool 16 turn as line is available coming off the capstan 22. As the line 18 is wound on the spool 16, the rotational speed of the spool slows down and likewise because of the pulley 58 direct drive to the level winder, it correspondingly slows down. When no further line is available to the spool, it will stop by full slippage taking place with respect to the spool and friction member 55. Hence, there is always a perfect winding of the line 18 onto spool 16 due to the corresponding of speeds at which the spool rotates and the level winding device advances up and down as positioned in FIG. 3. It will be noted, for example, that when line 18 is initially starting to be wound on the spool as made available from the capstan 22, the winding diameter on the spool is relatively small and a faster spool rotation occurs to accomplish winding, but as layers are added a slower spool rotation occurs to accommodate the increasing winding diameters. It should also be appreciated that the take-up spool 16 and the level winding device 20 form a subassembly which can be separately supplied to be assembled with an existing capstan 22 to form the cable pulling apparatus 10. It will be appreciated that while a single or common drive motor 24 is employed for the spool, level winder and capstan, the capstan can alternatively be driven cooperatively by a separate electric motor or the like.

It will further be appreciated that the driving arrangement for the take-up spool and level winder also prevents spillage of cable-pulling line from the take-up spool. When the drive motor 24 is shut off, and the rotation of motor drive shaft 28 stops, brake latch 59 engages one of the cammed surfaces 54b to prevent reverse rotation of ratchet brake disc 54. In the absence of brake latch 59, the tension on the pulling line could tend to rotate take-up spool 16 in a reverse direction, which would in turn cause reverse rotation of ratchet brake disc 54. The presence of brake latch 59, however, prevents this reverse rotation. Since resilient friction member 55 is fixed to ratchet brake disc 54, it also remains stationary. The friction between member 55 and pulley 58 thus serves to counteract reverse rotational force on the take-up spool 16, and thus prevent pulling line spillage. In the event the reverse rotational force exceeds the friction, the take-up spool will reverse rotate, but only until the tension in the pulling line is reduced such that the reverse rotational force on the take-up spool is again balanced by the frictional force exerted by member 55.

The drive arrangement also allows the capstan to be reverse driven without pulling line spillage from take-up spool 26. The cammed surfaces 53a of the ratchet drive disc are shaped so that they will not drive ratchet brake disc 54 when the motor 24 is reverse driven. The spring-loaded ratchet engaging pawls 54a merely slide around the outer surface of ratchet drive disc 53 when it is reverse driven. This action, and the presence of brake latch 59, prevent reverse rotation of disc 54. Reverse driving of motor 24 causes capstan 22 to rotate in reverse and play-out cable pulling line. This in turn causes a reverse rotational force on take-up spool 16. To the extent this force exceeds the frictional force of resilient member 55, the take-up spool will reverse rotate. No undue slippage occurs, however, since the reverse rotation stops when the frictional force from resilient friction member 55 again balances the reverse rotational force due to pulling cable tension.

Figure 4A:
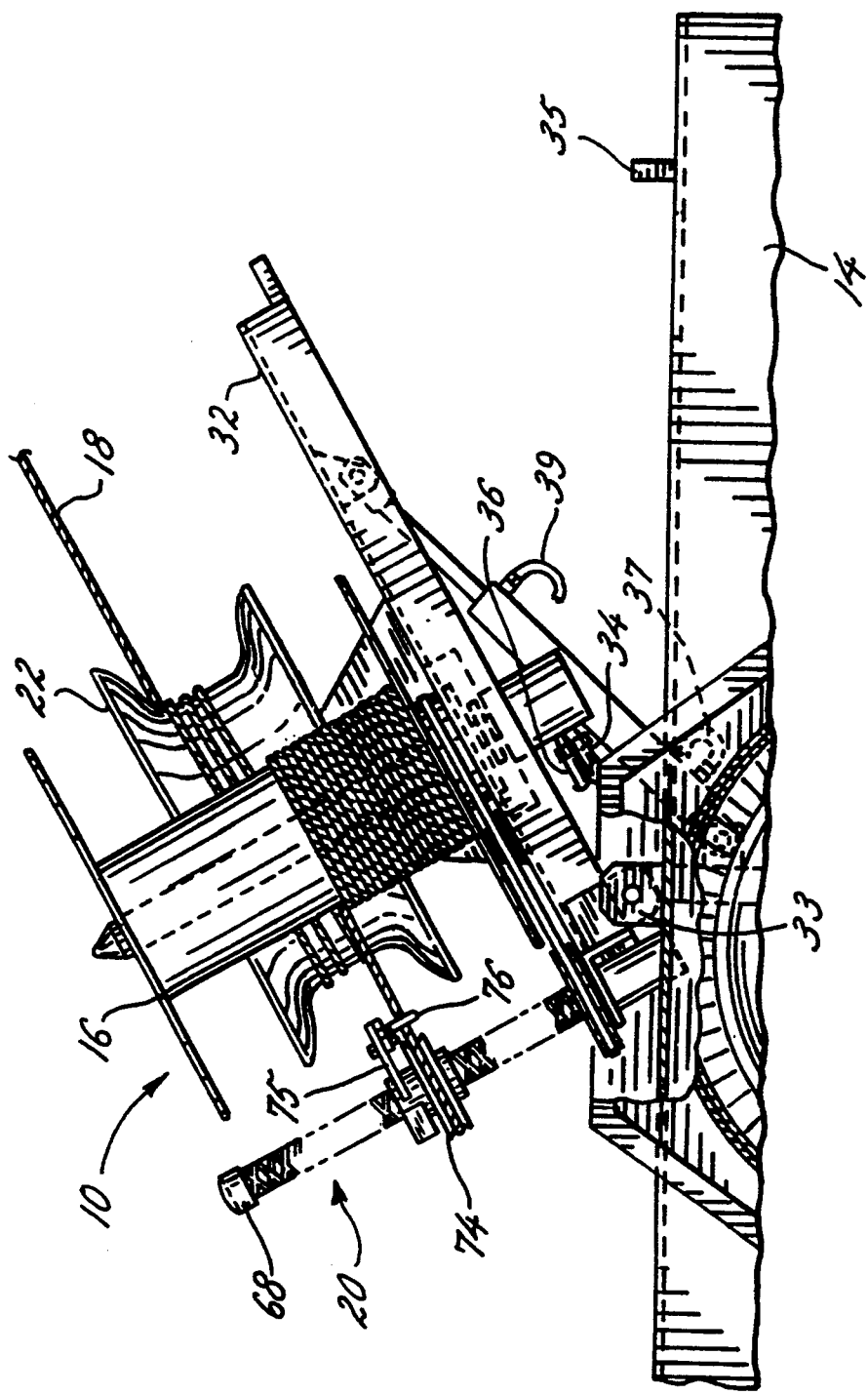
FIGS. 4A and 4B are side views showing the tilt table and apparatus in a raised and lowered position, respectively, and also illustrating the ranges of motion of the pulling apparatus.
Figure 4B:
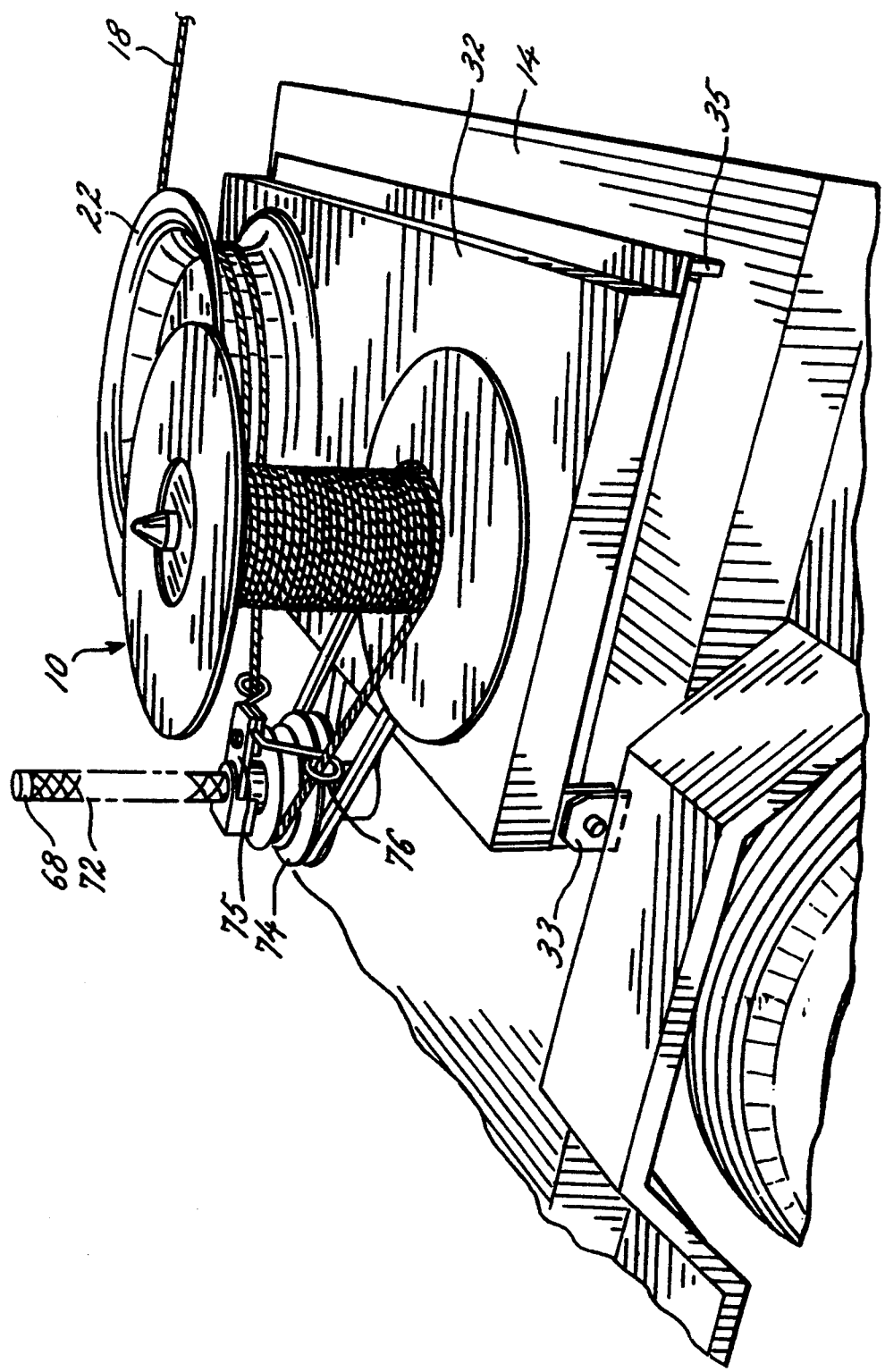

FIG. 4A shows the pulling apparatus 10 mounted onto the tilt table 32, which is in turn mounted onto the trailer frame 14. One end of the tilt table 32 is attached to the trailer frame 14 by pin type hinges 33 at opposite sides of one end. The other end of the tilt table 32 rests on blocks 35 attached to the frame 14. FIG. 4A shows the tilt table 32 in a raised position, where it can be seen that the tilt table 32 is attached on its underside to a hydraulic lifting device 37. The hydraulic lifting device 37 is driven by a pair of hydraulic lines 39 supplied by a power unit, such as the unit 26. The lifting device allows the tilt table to be raised and lowered at the discretion of the operator. This arrangement allows the operator to vary the pulling angle as may be desired according to particular cable stringing situations. The vertical raising of the tilt table provides for corresponding settings in the vertical axis as shown in FIG. 4A, while horizontal angularity is illustrated in FIG. 4B with the table in the lowered position.

Figure 5:
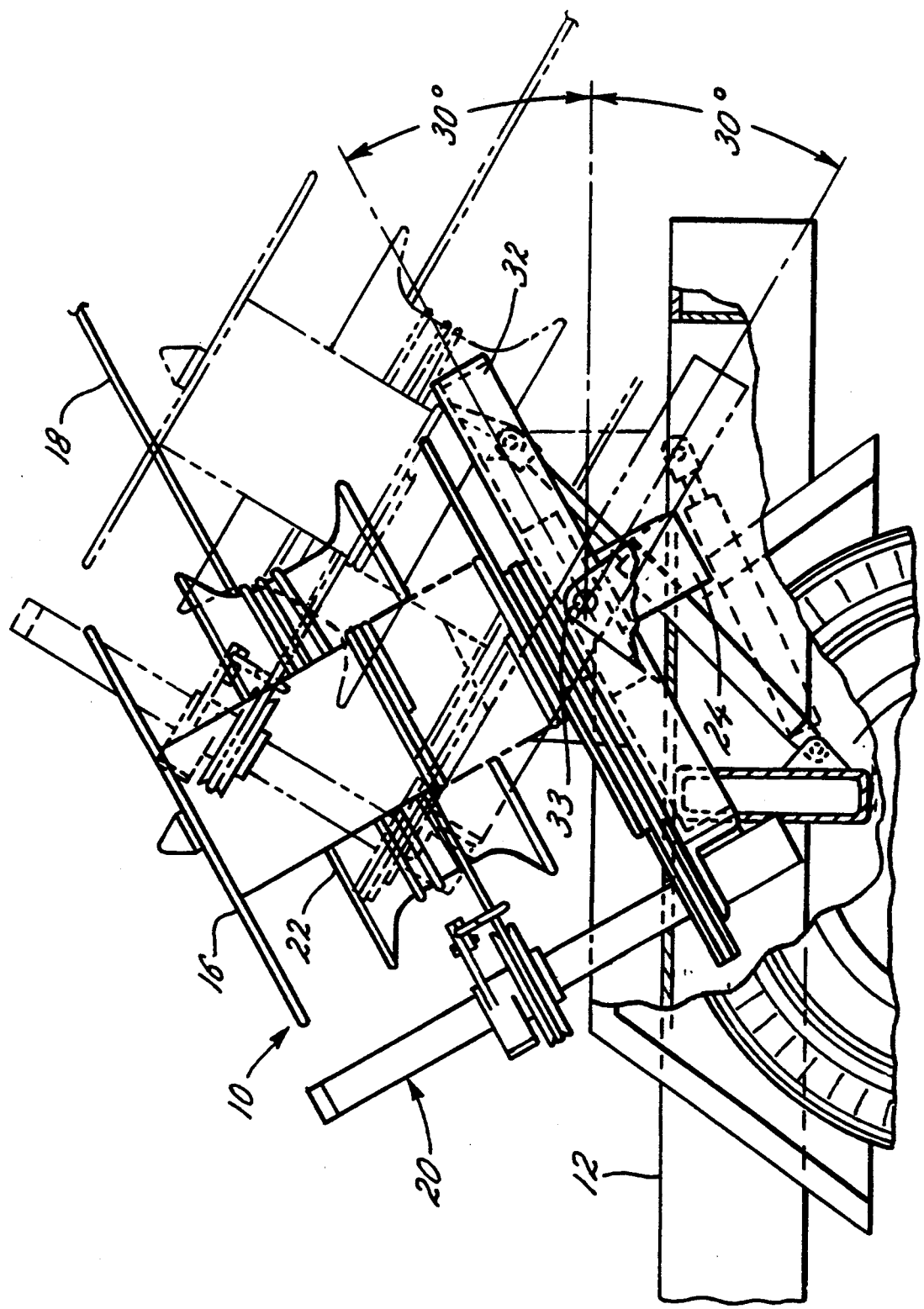
FIG. 5 is a side view of an alternative embodiment where the table is pivoted at its center to allow downward tilting from the horizontal position.

Referring to FIG. 5, there is shown an alternative form, where the tilt table 32 is hinged along its sides at the approximate center by pin hinges 33 and can be tilted downwardly as well as upwardly when viewed from the rear or left of FIG. 5. This arrangement allows the pulling apparatus 10 to be used for pulling underground cable such as from a manhole. Preferably, the tilt table 32 is permitted to angle the capstan 22 centerline up or down 30° from the horizontal.

Figure 6A:
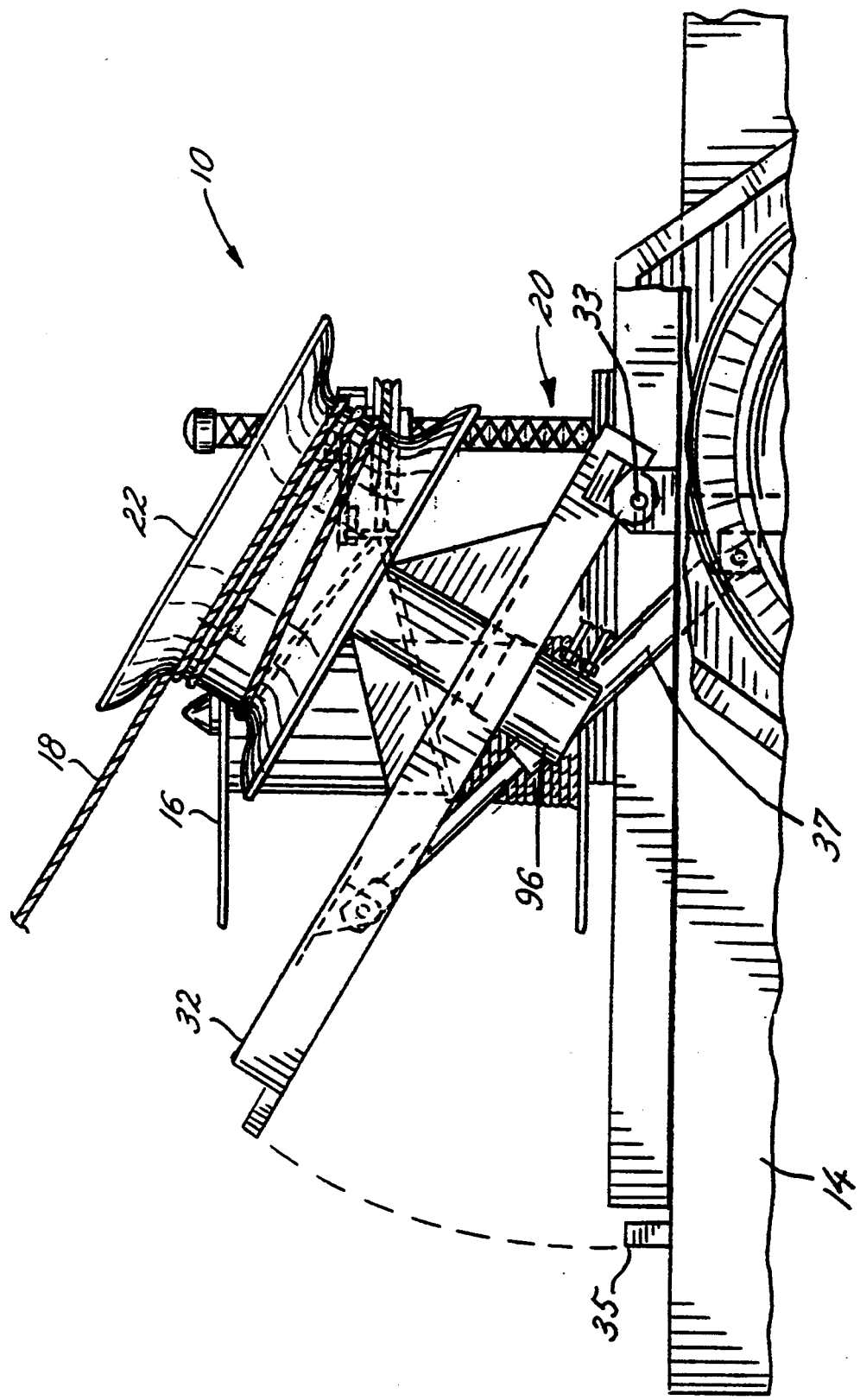
FIG. 6A is a side view showing an alternative embodiment where the tilt table is shown in a raised or tilted position.
Figure 6B:
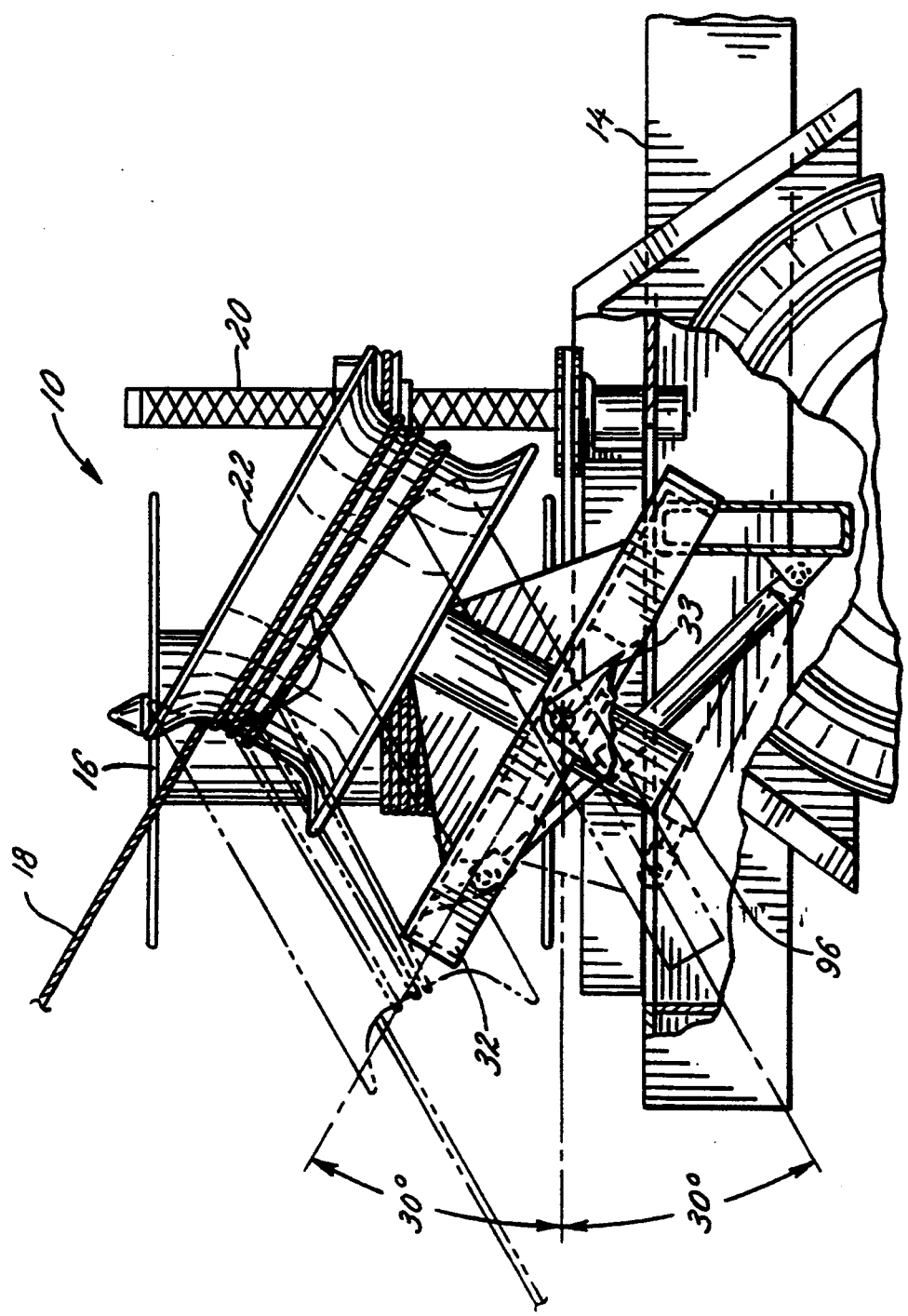
FIG. 6B is a side view of a further alternative embodiment where the table is pivoted at its center to allow downward tilting from the horizontal position.

FIG. 6A shows an alternative embodiment wherein only the capstan 22 is mounted on a tilt table 32. As in FIG. 4 (and using similar reference numerals) the table is hinged at the rear to allow capstan 22 to be raised to the position shown in FIG. 6A. FIG. 6B shows a similar arrangement, but with pin hinges 33 located near the center of tilt table 32, as in FIG. 5. Again, this allows for pivotal rotation both above and below the horizontal as shown in FIG. 6B. In the embodiment shown in FIGS. 6A and 6B, the capstan is preferably independently driven. Toward that end, capstan 22 has its own motor 96 coupled to it. The take-up spool and level winding device are still driven from a single motor.

I claim:

1. An apparatus for pulling cables or a pulling line attached to cables such as in stringing high tension electric lines comprising in combination:

a base surface means;

take-up spool driving means carried by said base surface means including motor means coupled to a motor drive shaft, said motor drive shaft being coupled to a first side of a frictional coupling, the second side of the frictional coupling being coupled to a spool receiving means;

said spool receiving means and second side of the frictional coupling being adapted to removably receive a spool;

a level winding means being mounted on a shaft carried by said base surface means, said level winding shaft being rotatably driven by belt and pulley means from the spool receiving means;

said level winding means including a level winding screw means and a level winding pulley reversibly drivable thereon, through which said pulling line is passed to the take-up spool;

a captan means mounted on a drive shaft carried by said base surface means;

said captan drive shaft and said motor drive shaft at the first side of said frictional coupling including respective sprockets and chain means to drive said capstan therefrom so that said pulling line passed to the take-up spool through said level winding means is evenly would on said spool when driven by said motor means.

2. An apparatus for pulling cables or a pulling line according to claim 1 including a means for preventing spillage of said pulling line from said take-up spool when said motor means is inoperative or reverse driven.

3. An apparatus for pulling cables or a pulling line according to claim 2, wherein said motor drive shaft is coupled to said first side of said frictional coupling by a ratchet driving disc cooperating with a ratchet brake disc, said ratchet driving disc being fixed to said motor drive shaft and including at least one cammed surface, said ratchet braking disc being rotatable about said motor drive shaft and being coupled to said first side of a frictional coupling, and including at least one ratchet engaging pawl for engaging one of said at least one cammed surface to transfer rotational motion of said shaft to said ratchet brake disc.

4. An apparatus for pulling cables or a pulling line according to claim 3, wherein the ratchet driving disc cammed surfaces are adapted to engage said ratchet engaging pawl means when said motor means is being driven in a direction so as to wind pulling cable onto said take-up spool.

5. An apparatus for pulling cables or a pulling line according to claim 4 including a brake latch for preventing reverse rotation of said ratchet brake disc, said ratchet brake disc including a plurality of cammed surfaces engaged by said brake latch for preventing reverse rotation.

6. An apparatus for pulling cables or a pulling line according to claim 5 including a biasing spring for biasing said brake latch into engagement with said ratchet brake disc cammed surfaces.

7. An apparatus for pulling cables or a pulling line according to claim 2, wherein said base surface means includes a tilt table, said tilt table being pivotally mounted to said base surface means for simultaneously tilting said take-up spool, said level winding means, said motor means, and said capstan to allow pulling of said pulling line from various angles relative to a horizontal disposition of said take-up spool.

8. An apparatus for pulling cables or a pulling line according to claim 7 including a hydraulic lifting device for pivoting said tilt table.

9. An apparatus for pulling cables or a pulling line according to claim 8, wherein said tilt table is pivotally mounted at the end thereof.

10. An apparatus for pulling cables or a pulling line according to claim 8, wherein said tilt table is pivotally mounted near the center thereof.

11. An apparatus for pulling cables or a pulling line according to claim 1, wherein said base surface means includes a horizontal table and a tilt table, said tilt table being pivotally mounted to said base surface means for tilting said captan to allow pulling of said pulling line from various angles relative to a horizontal disposition of said captan, said captan being driven independently of said take-up spool.

12. An apparatus for pulling cables or a pulling line according to claim 11 including a hydraulic lifting device for pivoting said tilt table.

13. An apparatus for pulling cables or a pulling line according to claim 12, wherein said tilt table is pivotally mounted at the end thereof.

14. An apparatus for pulling cables or a pulling line according to claim 12, wherein said tilt table is pivotally mounted near the center thereof.

15. An apparatus for pulling cables or a pulling line according to claim 2, wherein said level winding means includes a screw follower for rotatably receiving said level winding pulley, such that said level winding pulley rotates about said screw follower, and moves vertically along with said screw follower, said screw follower cooperating with said level winding screw means to reversibly drive said level winding pulley on said screw means.

16. An apparatus for pulling cables or a pulling line according to claim 15, wherein said screw follower includes a line guide mounted on an arm fixed to said screw follower, said line guide engaging said pulling line to prevent rotation of said screw follower relative to said level winding screw means and causing said screw follower to be reversibly driven on said level winding screw means.

17. A method of pulling a pulling line attached to a cable by way of a capstan, level winding device and take-up spool, respective ones of which are carried on a base surface means, said method comprising:

pulling said pulling line attached to said cable first around said capstan;

winding said pulling line from said capstan around the take-up spool via the level winding device;

driving said take-up spool by mounting said take-up spool on a take-up spool receiving means, and mounting said spool receiving means through a frictional coupling to a rotatable motor drive shaft and coupling a motor to said motor drive shaft and actuating the motor for driving said take-up spool;

driving said level winding device from said take-up spool in a manner so as to level wind the pulling line on the spool;

driving said capstan cooperatively with said take-up spool such that the increased diameter of pulling line caused by winding of the pulling line onto the take-up spool is compensated by slipping of the take-up spool through the frictional coupling and slowing of the level winding device to accommodate the reduced speed of the take-up caused by the slipping.

18. The method of claim 17, wherein driving said take-up spool includes mounting said take-up spool receiving means through said frictional coupling to a ratchet brake disc freely rotatable about said motor drive shaft, and driving said ratchet brake disc with a ratchet drive disc mounted to said motor drive shaft.

19. The method of claim 18, wherein driving said capstan cooperatively with said take-up spool includes coupling said motor drive shaft to a capstan drive shaft on which said capstan is mounted via drive sprockets mounted on each shaft.

20. The method of claim 19, wherein driving said level winding device from said take-up spool includes coupling said spool receiving means to a shaft on which said level winding device is mounted, said coupling being via a set of drive pulleys, and driving said spool receiving means.

21. The method of claim 18, wherein driving said take-up spool includes preventing spillage of pulling line from said spool when said motor is inoperative or being reverse driven.

22. The method of claim 21, wherein preventing spillage of pulling line from said spool includes latching said ratchet brake disc with a brake latch to prevent reverse rotation of said ratchet brake disc.

23. The method of claim 22, wherein preventing spillage of pulling line from said spool includes driving said ratchet brake disc in only one rotational direction.

24. The method of claim 23, wherein preventing spillage of pulling line from said spool includes providing said ratchet brake disc with ratchet engaging pawls and driving said ratchet brake disc with a ratchet drive disc including cammed surfaces for engaging said ratchet engaging pawls.

25. The method of claim 17 including mounting said take-up spool, said capstan, and said coupling means on a tilting table which allows pulling from various angles.

26. The method of claim 17 including a step of pivoting said base surface means carrying said take-up spool, said capstan and said level winding device from a horizontal position to a relative angular position for pulling from various angles relative to the horizontal position.

27. The method of claim 17 including independently driving said capstan and pivoting a portion of said base means, said portion carrying only said capstan and an independent driving means, from a horizontal position to a relative angular position for pulling from various angles relative to the horizontal position.

* * * * *